United States Patent [19]

Martin

[11] Patent Number: 4,638,427
[45] Date of Patent: Jan. 20, 1987

[54] PERFORMANCE EVALUATION FOR AN ASYMMETRIC MULTIPROCESSOR SYSTEM

[75] Inventor: Daniel B. Martin, Poughkeepsie, N.Y.

[73] Assignee: International Business Machines Corporation, Armonk, N.Y.

[21] Appl. No.: 600,622

[22] Filed: Apr. 16, 1984

[51] Int. Cl.[4] .......................... G06F 15/16; G06F 9/44
[52] U.S. Cl. ...................................................... 364/200
[58] Field of Search ... 364/200 MS File, 900 MS File, 364/300

[56] References Cited

U.S. PATENT DOCUMENTS

| | | | |
|---|---|---|---|
| 4,084,228 | 4/1978 | Dufond et al. | 364/200 |
| 4,392,196 | 7/1983 | Glenn et al. | 364/200 |
| 4,432,051 | 2/1984 | Bogaert et al. | 364/200 |
| 4,435,759 | 3/1984 | Baum et al. | 364/200 |
| 4,485,440 | 11/1984 | Duff et al. | 364/200 |
| 4,590,581 | 5/1986 | Widdoes | 364/578 |

*Primary Examiner*—Archie E. Williams, Jr.
*Attorney, Agent, or Firm*—Bernard M. Goldman

[57] ABSTRACT

Accurate and repeatable time accounting is done in an asymmetric multiprocessing system (AMP) by converting the actual execution time of each dispatch of a task on a minor processor in the AMP to an equivalent execution time which would have been obtained if the dispatch had instead been on the major processor in the AMP, so that the overall task time in the AMP is independent of whether the task is dispatched on a minor processor or a major processor in the AMP. Dispatching on an AMP is made more efficient by determining an affinity value (AV) for each task. The AV is the ratio of the task's emulation time on the minor processor to the task's total dispatch time on all processors in the AMP. A low affinity value (near zero) indicates better efficiency for the task by next dispatching it on a minor processor. A high affinity value (near one) indicates better efficiency for the task by next dispatching it on a major processor. The affinity value may be based on all prior dispatches fo the task (i.e. average affinity value), or it may be determined only for the last dispatch (i.e. last affinity value). The accounting time adjustment and the affinity value control over dispatching are separate and independent functions; and either may be provided in an AMP without the other, or both may be provided.

16 Claims, 5 Drawing Figures

PERFORMANCE EVALUATION FOR AN ASYMMETRIC MULTIPROCESSOR SYSTEM

BACKGROUND OF THE INVENTION

The invention relates generally to improving the performance of an asymmetric multiprocessor (AMP) system.

Most prior multiprocessors are symmetric systems containing plural processors all having identical characteristics.

An asymmetric multiprocessor system is composed of two or more processors which have distinctly different performance characteristics resulting in different performance rates, including a major processor with a greater capability and a minor processor with a lesser capability. The reason why asymmetric processors may be used is because a minor processor may be built with a much better cost/performance ratio than a major processor, when the minor processor is designed to directly execute only a subset of the system instructions directly executable by the major processor. A system instruction set is used by all programs dispatched in the system on either the major or minor processor. Thus many internal differences may exist between the different types of processors in an AMP including differing speeds of execution (usually quantified in MIPS, millions of instructions per second), and different efficiencies in executing the different system instructions. In an AMP, a major processor may have a complete internal native instruction set implemented in hardware/horizontal microcode which directly executes the system instruction set, including variable field-length operations and floating point operations. The minor processor may have a less comprehensive internal hardware/horizontal microcode instruction set (native instructions) which can directly execute only a subset of the system instructions directly executable by the native instructions in the major processor. However with some loss in performance, the addition of vertical microcode for the minor processor provides it with the capability of executing the complete system instruction set by using emulation (e.g. by vertical microcode) for those system instructions not directly executable by the minor processor. Emulation by vertical microcode is accomplished by stored program routines consisting of minor processor native instructions that execute on the minor processor to perform those system instructions which are unavailable in the native instruction set of the minor processor. Hence, a plurality of native instruction executions may be required on the minor processor to emulate one system instruction. With a preferred type of minor processor, many (but not all) of its native instructions will be system instructions which therefore will not require emulation. Other types of minor processors may require emulation of all system instructions, because none of their native instructions will match any system instruction. Consequently, the relative efficiencies of the major and minor processors of an AMP will depend on the relative processor designs and on the instruction mix in programs being executed.

All processors in an AMP generally will be simultaneously executing their own independent tasks. In any multiprocessor system, tasks are assigned to each processor for execution according to a dispatching algorithm which attempts to keep all processors busy in the MP.

Processing of a task is likely to be interrupted by various events, such as interrupts caused by input/output devices. At the time of an interrupt, software mechanisms save all information for a task necessary to resume work at a future time. Upon resumption of execution of an interrupted task, there is no certainty in a multiprocessor system that the same processor will resume work on the interrupted task. Thus, on multiple dispatches of a task, the task may have used differing amounts of CPU time on different processors.

In the prior art, precise accounting is done to obtain the execution time on each processor for each task.

Prior symmetric multiprocessor systems have multiple processors with identical capabilities. Therefore, a task can be dispatched to any available processor in the system, and the task time will be equally well accounted for in any processor. That is to say, a microsecond of CPU time in any of the processors can be said to have equal processing value.

Also in a symmetric system, arbitrary selection among the processors for each next dispatch of any task does not present any system efficiency problem, since any processor in a symmetric system can equally well execute any task.

SUMMARY OF THE INVENTION

In an AMP, conventional time determinations for a task will vary as a function of the types of processors on which the program is dispatched. Also, conventional dispatching control programs in an AMP will not consider which type of processor can most efficiently execute a program, and system efficiency in an AMP is affected by the different types of processors which may execute a task.

Thus, in an asymmetric multiprocessor system, the dispatching and time accounting problems become distorted when conventional techniques are used.

This invention enables accurate and repeatable accounting to be done on an AMP. Accounting repeatability is obtained by converting the actual execution time on one type of processor to equivalent execution time on another type of processor used as the standard for time accounting in the system, so that task time determinations will be independent of which type(s) of processor(s) on any task is dispatched in an AMP.

In a preferred embodiment of an asymmetric system, this invention modifies the time measurements for a processor as a function of emulation done for each task by the processor, in order to match the requirements of a task with the capabilities of the processors to obtain accounting repeatability.

This invention also enables the aggregate instruction processing rate of an asymmetric multiprocessor system to be increased by exploiting the different performance characteristics of plural types of processors in comparison to arbitrarily dispatching a task on any available processor.

This invention also enables asymmetric processors to be chosen for dispatching so that tasks may be preferentially dispatched to a processor which can most efficiently execute the task. For example, if a task involves substantial amounts of scientific computation (e.g. a large number of floating point operations not efficiently handled by a smaller processor in the system), then a larger processor (with the floating point instruction set) may more efficiently execute that task. However, if the task does not involve a large number of floating point (as might be the case for many internal housekeeping operations or for simple data manipulations), then the task may be more efficiently assigned to a smaller processor with lesser capabilities, which may be able to run such task as quickly as the larger processor.

The invention also eliminates a burden on programmers by not requiring them to specify their preference among the processors for dispatching their tasks. The invention enables the system to develop processor preference information dynamically as the task executes. Preferential dispatching of a task to a particular processor has the problem of depending upon the instruction mix constituting that task, and upon the preferences of the other tasks concurrently being executed. On the other hand, arbitrary processor seletion may result in selecting a particular processor not well suited to execute a task awaiting execution, yet flexibility must exist in the dispatching controls to allow any processor in an AMP to be selected to execute some task inefficiently rather than allow a processor to remain idle.

Accordingly, an object of this invention is to provide consistent and repeatable task time accounting on an asymmetric multiprocessing system by providing adjustments in the task dispatch time on any of the processors having unequal capability.

A further object of this invention is to increase the efficiency of operation for an asymmetric multiprocessing system by dynamically providing dispatching preferences for tasks among unequal processors.

The invention provides accounting methods for use in asymmetric multiprocessor systems which sense emulation/non-emulation operations in a minor processor to adjust its execution time for system instructions executed on the minor processor. This invention can handle the time adjustment in an AMP for a minor processor which emulates any proportion of the system instructions, or where special conditions exist for the minor processor. In the preferred case, a minor processor executes each of its native instructions in equal units of time but emulated system instructions take many units of time. The emulation time for each emulated system instruction is proportional to the actual number of native instructions used to execute the system instruction. The time measurements on the minor processor for each of its task dispatches is determined as: (1) the "total CPU execution time" spent by the minor processor (i.e. for both emulated and non-emulated system instructions), and (2) "emulation time" by the minor processor for only the emulated system instructions. The emulation time measurement may be indirectly determined by counting the number of native instructions executed during the dispatch. The emulation time for each dispatch is obtained at the end of each dispatch on the minor processor, and it is used to adjust its total dispatch time in order to derive an adjusted minor processor dispatch time equal to an equivalent dispatch time on the major processor which would have been obtained if the dispatch had instead been on the major processor.

Dispatching on an AMP is made more efficient by the invention determining an affinity value for each task which is the ratio of the task's emulation time on the minor processor to the task's total dispatch time on all processors in the AMP. A low affinity value (near zero) indicates better efficiency for the task by next dispatching it on the minor processor. A high affinity value (near one) indicates better efficiency for the task by next dispatching it on the major processor.

The affinity value may be based on all prior dispatches for the task (i.e. average affinity value), or it may be determined only for the last dispatch (i.e. last affinity value).

The accounting time adjustment and the affinity control over dispatching are separate and independent functions; and either may be provided in an AMP without the other, or both may be provided.

DETAILED DESCRIPTION OF THE PREFERRED EMBODIMENTS

Figure 1:
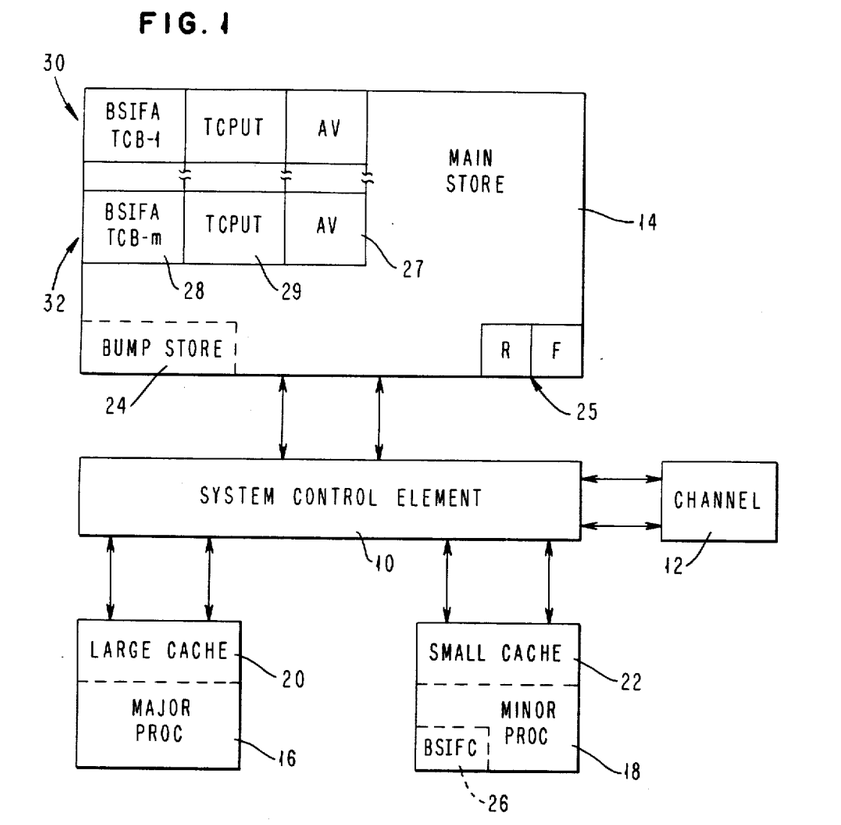
FIG. 1 is a block diagram of an asymmetric multiprocessor system.

An example of an asymmetric multiprocessing system is shown in block diagram form in FIG. 1. A system control element 10 manages the flow of data through the system and assures data integrity throughout the system. Processing elements 16 and 18 control the overall execution of the task and direct the flow of data. Data can flow into a main storage 14 through element 10 from a channel 12. In the illustrated embodiment, there are two asymmetric processors connected to the system control element 10. Systems may be built with more than one processor of a given capability. One of these is the major processor (MAJOR) 16, which is the faster (and more costly) processor. It can execute the full System/370 instruction set of the multiprocessor system. A second processor is the minor processor (MINOR) 18, which is the slower processor. It can internally execute only a portion of the full System/370 instruction set. Directly attached to the MAJOR 16 is a cache 20. A cache is a relatively small, but very fast, memory attached to a processor. A cache is transparent to its associated processor which simply requests any element of main store 14. If the requested data or instruction is already in the cache, it can be immediately accessed and acted upon. However, if it is not in the cache, the system control element 10 must transfer it from the main store 14 to the cache associated with the processor. The former case is a cache hit and the latter case is a cache miss. Obviously a cache miss takes longer to execute than a cache hit. A smaller cache 22 may be associated with the MINOR 18. In a cache miss, the system control element 10, in order to maintain date integrity, must determine if another cache contains a more recent version of the desired data, in which case the most recent version is fetched to the requesting cache. Because of the differing size of the caches 20 and 22, the MINOR 18 will, on the average, suffer more cache misses and therefore will tend to have a lower adjusted execution rate than the MAJOR 16 even for the instructions which have been implemented in both processors.

As previously stated, the internal native instruction set implemented in MINOR 18 is not a complete system instruction set. Nonetheless, MINOR 18 may execute any system instruction by using emulation, such as by a vertical microcode routine for each system instruction not internally implemented in MINOR 18. Non-emulated system instructions are those system instructions which have been implemented for direct execution by MINOR 18 and do not require emulation.

All system instructions have been internally implemented on the MAJOR 16, which can execute any system instruction without emulation.

Figure 2:
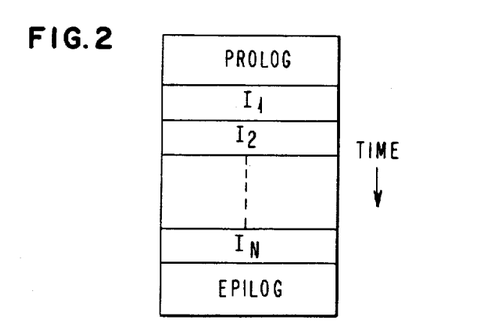
FIG. 2 is a pictorial representation of the execution sequence of an emulated instruction.

MINOR 18 is a less complex but also is a slower processor than MAJOR 16. As previously stated, MINOR 18 can with emulation assistance execute all the system instructions executable by the MAJOR 16. If MINOR 18 encounters an emulated instruction that it cannot directly execute, it goes into an emulation routine, such as illustrated in FIG. 2. The first part or prolog to the emulation routine is hardware/horizontal microcode operations which set up the execution of the vertical microcode. The vertical microcode consists of N number of instruction fetches of the MINOR processor's internal native instructions $I_1$ through $I_N$.

An epilog is done by hardware/horizontal microcode at the end of the vertical microcode routine to complete its operation for MINOR 18.

The emulation routines are stored in a bump store 24 part of the main store 14 and are transferable to a MINOR cache 22, which may be conventional. The bump store 24 (sometimes called the system area) is not accessible to the task programmer. In the present embodiment, all the internal native instructions which comprise the emulation routines of the minor processor stored in the bump store 24 (i.e. $I_1$ through $I_N$) are of equal length and each takes one cycle to execute in the MINOR 18. The number N of instructions in an emulation routine must be initially fetched from the bump store 24 into cache 22. It can be seen in FIG. 2 that, except for the prolog and the epilog, the amount of time necessary to execute an emulated system instruction is proportional to the number N of instruction fetches from the bump store 24.

The MINOR 18 hardware is implemented with a bump store instruction fetch counter (BSIFC) 26 which counts the number of instruction fetches from the bump store 24 and cache 22, which are distinguished by their addresses or other identifying marks. The BSIFC 26 does not distinguish if the fetch is direct from the bump store 24 or from the cache 22, i.e., cache misses are ignored. In one example of a MINOR processor, the instructions are fetched two at a time, so that the count in the BSIFC 26 is only half of the actual number of fetched instructions. When the minor processor 18 is interrupted at the end of each dispatch of any task, the contents of the BSIFC 26 are added to an accumulator field BSIFA 28 that is in the task control block 30 or 32 associated with the task just ended on the MINOR 18. The BSIFC 26 is then reset to zero at the end of each dispatch for reuse by the next dispatch of MINOR 18.

Also, the total CPU time for each task is stored in another field TCPUT in each task control block. Both the BSIFA and TCPUT fields are set to zero at the beginning of each task in the associated task control block.

Whenever a task is interrupted on MAJOR 16, the MAJOR Execution Time (MAJOR EX T) during the last dispatch on MAJOR 16 is determined in the conventional way (e.g. by the IBM Resource Monitor Facility, RMF) and is added to field TCPUT in the respective task control block for the dispatch just completed. Likewise a MINOR Execution Time N is conventionally determined for the last dispatch, but it must be adjusted by this invention before it can be added to field TCPUT.

The overall instruction processing rate for the MAJOR 16 may be (for example) twice that of the MINOR 18, and MINOR 18 may cost one third of the MAJOR 16. Hence, the two processors are located at different points on the cost versus performance curve. The individual system instruction performance ratio can, for example, vary from 1:1 for simple register to register instructions, like add register, to 30:1, 40:1, 50:1 or more for more complex system instructions, like multiply long. The higher ratios arise from emulated system instructions on MINOR 18, which needs to execute a vertical microcode routine with a large number of internal native instructions fetched from the bump store 24.

These varying instruction ratios illustrate a non-linear relationship between MINOR and MAJOR processors for the various system instructions. That is, linearity would exist if the same ratio existed for all system instructions.

The intermediate values for instruction performance ratios are affected by the increased probability of cache misses due to the relatively smaller cache memory 22.

The underlying difficulty in the time accounting problem is that the instruction processing rates of the asymmetric processors are not linearly related, due to the non-linearity introduced by the emulated instructions.

A task which would require execution of a relatively large number of emulated instructions on MINOR 18 is less efficient on MINOR 18 and should be preferentially dispatched to the MAJOR 16 if available. A task which would require mostly non-emulated instructions on MINOR 18 is more efficient on MINOR 18 and should preferentially be dispatched to the MINOR 18 if available. It must be emphasized that the dispatching algorithm uses this information in the preferential sense because it also depends on other factors. For example, if the preferred processor is not available, but a non-preferred processor is available, it is more efficient for the system to then dispatch the task on the non-preferred processor, rather than allow it to continue in an idle state. Nevertheless, much of the dispatching will be on the preferred processor.

Each time a task is interrupted, the operating system updates the relevant accounting information in the associated task control block 30 or 32. If the task had been dispatched to the MAJOR 16, the updating of the accounting information is done in the prior-art way, like the same way it is currently done on a uniprocessor (UP) or a conventional symmetric multiprocessor system. However, if the task had been dispatched to the MINOR 18, the time accounting uses the steps provided by this invention to determine a value N(M) which is the MINOR execution time, N, for each task converted to time units (e.g. machine cycles) used by the MAJOR, M.

At the end of each dispatch on MINOR 18, the task's emulation execution time E is proportioned to the content of BSIFC counter 26, which is then added to the content of field BSIFA 28 in the related task control block. The content of BSIFA 28 is then proportional to the MINOR processor's execution time of the associated task time for doing emulation of system instructions.

The BSIFA 28 provides a means of extracting the non-linearity from the task execution time value N(M) due to MINOR 18.

Each summation over a task may be represented by the symbol $\Sigma_K$. Thus, the value in each BSIFA is $\Sigma_K E$ for task K for emulated system instructions.

Since two vertical microcode instructions are fetched at a time by MINOR 18, the count on BSIFC 26 is one-half the number of fetched vertical microcode instructions.

The value of the task dispatch time N on MINOR 18 must be adjusted so that the non-linear performance differences between MINOR 18 and MAJOR 16 do not enter into the billing charges for a task. This embodiment reduces N to an adjusted value N(M) in which N is represented in terms of the corresponding time units that would have occurred if the task had always been dispatched on MAJOR 16. This adjustment is done by the following computation at the end of each task dispatch on MINOR 18:

$$N(M) = (R \times N) + (F \times E)$$

in which,

N = MINOR 18 execution time for the dispatch;
R = a constant representing the proportion of dispatch time N which would have been used by the non-emulated system instructions if they had been executed on MAJOR 16;
E = the emulation fetch count in BSIFC 26 at the end of each dispatch on MINOR 18;
F = a multiplier constant for the emulation fetch count E to convert E into a corresponding dispatch time on MAJOR 16 for the executed system instructions requiring emulation on MINOR 18.

The values R and F are provided in fields in a control block 24 in main storage 14 for availability to all tasks.

The preferred embodiment assumes a fixed non-emulation ratio, R, of the MAJOR to the MINOR processors when the MINOR processor is executing only non-emulated instructions, i.e. native to the MINOR processor. Cache miss time is accounted for in ratio R.

Each emulated system instruction executes a vertical microcode routine comprising instructions $I_1$, through $I_N$ shown in FIG. 2 which are fetched from main storage 14. However, MINOR 18 also spends time in hardware and horizontal microcode operations which are not fetched from main storage 14, and are represented in FIG. 2 as the prolog for preparing to access each vertical microcode routine and the epilog for housekeeping after the end of each vertical microcode routine. Each non-emulated instruction may be thought of as only comprised of a prolog and an epilog without any vertical microcode, $I_1 \ldots I_N$.

The non-emulation ratio R accounts for all prologs and epilogs for both the emulated and non-emulated instructions on MINOR 18.

The value E from the BSIFC 26 is the number of vertical microcode instruction fetches (from bump store 24 and cache 22) for the execution of every emulated instruction in the last dispatch of the associated task. The value E is multiplied by an appropriate constant F and the result is then an adjusted value of E in MAJOR time units.

The total CPU dispatch time for a task on all CPUs in the AMP is generated in a field TCPUT in each task control block 30, 32. The way this invention generates the total CPU dispatch time is by the following computation:

$$TCPUT = \Sigma_K(MAJ\ EX\ T) + \Sigma_K N(M)$$

in which:

MAJ EX T = the execution time for MAJOR 16 at the end of each dispatch on MAJOR 16 for this task.
N(M) = result of N(M) computation defined above at the end of each dispatch on MINOR 18 for the same task.

Constant R is determined by a thorough operational evaluation of each minor processor in an asymmetric multiprocessor system under realistic or standardized workloads to remove variations of chargeable time dependent on dispatch to one or the other of the processors.

The effect of the above-described accounting is to separate MINOR execution time into non-emulation time $R \times N$ and emulation time $F \times E$ which are provided in terms of a corresponding execution on MAJOR 16.

The value for the non-emulation ratio R is determined in the following manner:

$$R = \frac{\text{Execut. time for non-emulated instruc. on MINOR 18}}{\text{Execut. time for the same instruc. on MAJOR 16}}$$

One method of arriving at a value for the non-emulation ratio R is to execute a standard workload once on the MAJOR 16 and once on the MINOR 18 while excluding from the tested workload all system instructions requiring emulation on MINOR 18. The ratio of the instruction processing time on the MAJOR 16 to that on the MINOR 18 is then the non-emulation ratio R. This determination of the non-emulation ratio R needs to be done only once for each combination of major and minor processors. Duplicate combinations will have the same ratio R.

The normalized value of N(M) should not be affected by arbitrary dispatching of a task between the MAJOR 16 and MINOR 18 processors, due to the repeatable characteristic obtained by the conversion factors used by this embodiment, which make N(M) useful in determining AMP computer billings.

The accumulated accounting information can also be used by the dispatcher program for CPU selection in an AMP for selecting among ready tasks awaiting to be dispatched. The dispatcher program is generally invoked whenever any CPU ends a dispatch and becomes available to work on another task. The dispatcher may then chose a ready task by using an affinity value (AV) generated from the accounting information described above. It is defined as:

$$AV = \frac{\text{Total Task Emulation Execution Time on MINOR}}{\text{Total Task Execution Time on MAJOR and MINOR}}$$

Thus, an average AV can be computed at any time for the dispatcher program by the following accumulated values in the associated task control block.

Average AV = BSIFA Content/TCPUT Content

The average AV is stored in an AV field in the associated task control block 30, 32.

Also the last dispatched AV can be computed at the end of the last dispatch of any task on MINOR 18, as follows:

$$Last\ AV = E/N$$

where the values E and N are determined as previously described.

The Last AV may be stored in field AV of the associated task control block 30, 32 instead of the Average AV. If the Last AV is being used, the Average AV need not be computed.

A high value of AV (whether Average AV or Last AV) indicates that the task has a large proportion of system instructions which would require emulation if executed on the MINOR 18, and therefore indicates that task is more efficiently executed on MAJOR 16. If the task had relatively few emulated instructions executed on the MINOR 18, then a low value for AV would result, which would indicate the task is more efficiently executed on MINOR 18. When the dispatcher is faced with the decision of selecting one of plural ready tasks for being dispatched on the MAJOR 16 or the MINOR 18 for execution, a task with a high AV would preferentially be dispatched on the MAJOR 16, and a task with a low AV would be preferentially dispatched on the MINOR 18.

It is to be appreciated that the Average AV for a task is updated every time that task is interrupted. Therefore its Average AV is a dynamic history of its execution.

However, the Last AV may be preferred to the Average AV when the next dispatch of a task is more likely to have the system instruction mix of the last dispatch, rather than the system instruction mix of the entire previous execution by the task.

Each time a processor becomes inactive, the dispatcher in the operating system is faced with the important decision of choosing the task to be dispatched next to that processor. If there are no tasks which are ready to be dispatched, that processor goes into the wait state and becomes idle. Usually there are many tasks which are ready to be dispatched and one of them needs will be selected. The dispatching algorithm is the means by which the selection is made.

Conventional dispatching algorithms are complex and use several parameters, such as: the time since each ready task was last dispatched; the relative priority of each ready task; the I/O affinity of each ready task for a specific processor that has become available. Conventional multiprocessor systems have processors equal in their relative computing power but may differ in their capability to do I/O. A task which must do I/O must then have I/O affinity for a processor with I/O capability. This invention uses a different affinity concept, which is the concept of "system instruction affinity" provided for asymmetric multiprocessor systems having processors with differing computational capability. The AV value is a measurement of system instruction affinity and is another parameter to be used by the dispatching algorithm in selecting the task to be dispatched to an idle processor. The value of AV (by itself) does not however completely determine where a particular task will be assigned to a processor. For example, if all ready tasks prefer MINOR 18 (low AV), but only MAJOR 16 is available, the wrong affinity value should not prevent an otherwise idle processor from receiving a dispatch, and the ready task with the highest of the low AVs is dispatched on MAJOR 16.

In summary, this embodiment enables CPU time accounting in an AMP to be made accurate and repeatable by converting the time of each minor processor dispatch into an equivalent amount of dispatch time for the major processor in the AMP. An increase in AMP system performance is brought about by providing system instruction affinity for ready tasks being dispatched in an AMP. Each minor processor contains a BSIFC in its hardware. In this embodiment, each task has an associated control block which has fields accumulating the task's time on each CPU in the AMP, the task's total bump store instruction fetch count, and may have a field for the Last AV value. Each task establishes and changes these values based on actual execution.

Figures 3, 4, 5:
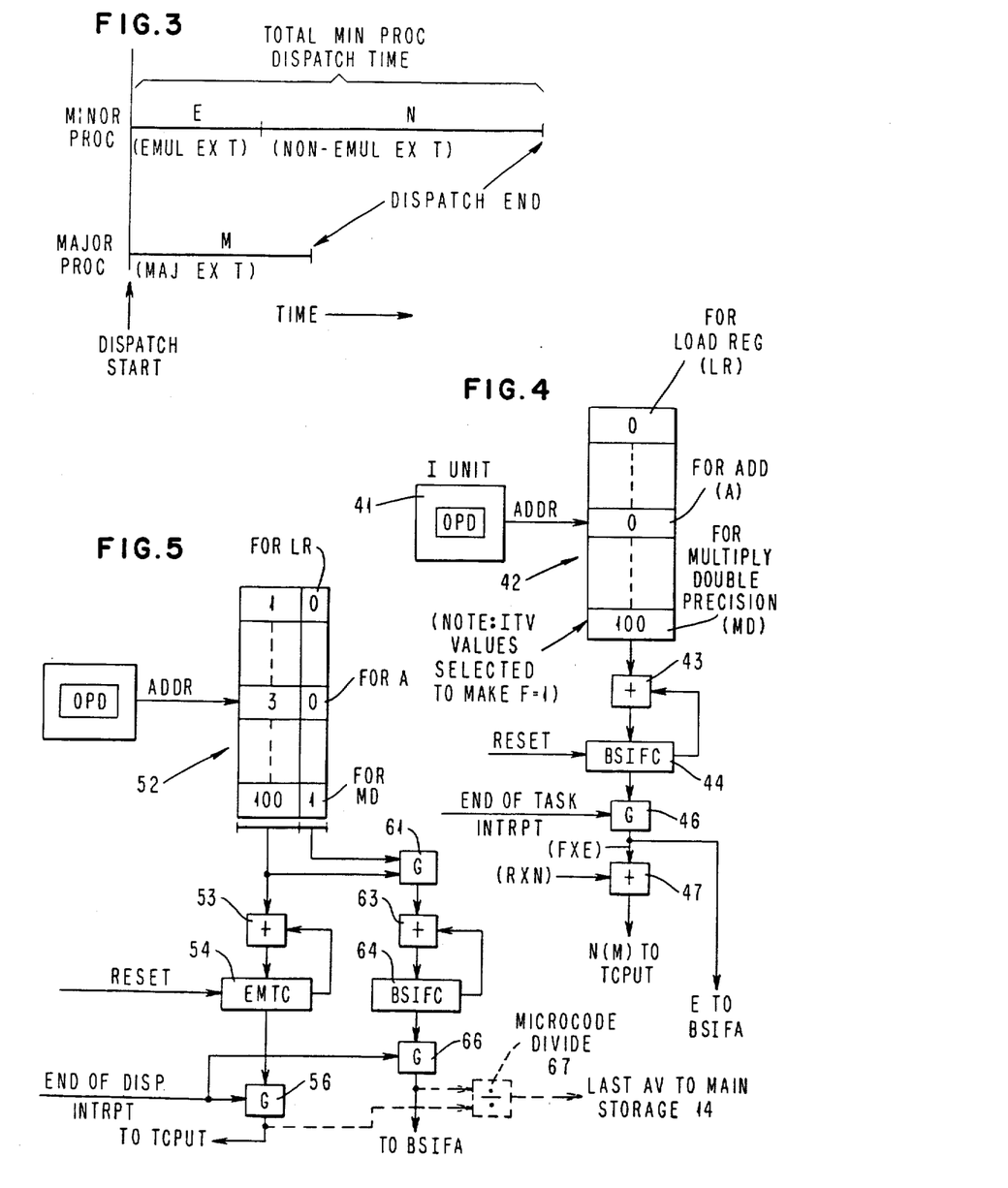
FIG. 3 is a time diagram illustrating the disparity of execution time for the same task dispatch on a minor processor and on a major processor.
FIG. 4 illustrates another embodiment of the invention.
FIG. 5 shows still another embodiment of the invention.

A second embodiment (which requires more CPU hardware) is shown in FIG. 4, which determines the actual execution time for each type of system instruction requiring emulation. Each instruction operation (OP) code being decoded in the instruction (I) unit of the MINOR 18 in the second embodiment generates an index to an entry in a system instruction set table 42. Thus, each OP code accesses a different entry in table 42. Each entry contains an instruction time value (ITV) which represents the emulation execution time of the respective system instruction in that MINOR 18 in in the time units of the MAJOR 16 in the AMP. For example, the entry for each system instruction (e.g. load register or add) not requiring emulation has an ITV of 0. An emulated system instruction has a non-zero ITV and may have a large ITV (e.g. floating point multiply double precision instruction may have an ITV of 100). Hence table 42 represents only the emulated system instructions.

As each system instruction is executed in MINOR 18, its ITV is outputted from table 42 and is added by an adder 43 to the current value in a BSIFC counter 44 to provide the next value in counter 44.

Counter 44 is reset to zero before beginning each dispatch. At the end of each dispatch, the content of BSIFC 44 is outputted by a gate 46 and is added to the content of BSIFA 28 in the related task control block. (Note that the BSIFA, TCPUT, and AV fields in the associated task control block are set to zero at the beginning of the task but not at the beginning of each dispatch.)

By making the ITV values equal to the time required for execution of the corresponding instructions in major processor 16, the F value will be unity, so that the output of counter BSIFC 44 is equal to both E and $F \times E$ in the previously defined formulas.

Then at the end of each task, the previously defined processes for generating the values of N(M), Average AV and Last AV may be performed in the manner previously described. The addition 47 of $F \times E$ (being outputted from gate 46) to $R \times N$ generates N(M), which is accumulated in field TCPUT in the associated task control block.

FIG. 5 shows a third embodiment which directly generates a corresponding MAJOR dispatch time for each task dispatch on MINOR processor 18. This is done with a table 52 which contains an ITV entry for every system instruction.

However in the table 52, the ITV content of each entry is non-zero (for both emulated and non-emulated instructions), in which each ITV is the amount of time that the corresponding instruction takes to execute on MAJOR processor 16.

An index address is likewise generated by the I unit from each operation code being executed to locate the ITV entry in table 52 representing that instruction. The addressed ITV entry outputs its contents to an adder 53.

At the beginning of each dispatch, an equivalent major time counter (EMTC) 54 within MINOR processor 18 is set to zero. Each system instruction executed during a dispatch outputs its ITV from table 52 to adder 53 which adds that ITV to the current content of EMTC 54, and the resultant sum replaces the content of EMTC 54. Thus, the outputted ITV values from table 52 (for all system instructions executed during a dispatch) are accumulated in EMTC 54.

At the end of each dispatch, the accumulated content in EMTC 54 is the time that the dispatch would have taken if that dispatch had instead been performed on the MAJOR processor 16. An end-of-dispatch interrupt signal causes counter 54 to output its contents via a gate 56, and it is directly added to the CPU time value in the TCPUT field in the associated task control block in main storage 14. After counter 54 is outputted, the end-of-dispatch interrupt resets counter 54 to zero.

In this manner table 52 operates with EMTC counter 54 to determine the adjusted CPU time for each task in the AMP, regardless of how many times any task was dispatched on any processor in the AMP.

If it is also required for the embodiment in FIG. 5 to determine affinity value (AV), then it is necessary to isolate the emulation time component from the total CPU time. This is done in FIG. 5 by providing an emulation flag field with each time entry in table 52 to indicate if the corresponding system instruction is emulated or not in the MINOR processor 18. It is a one bit field set to a 1 state for indicating emulation, and set to a zero state for indicating no emulation.

The setting of the emulation flag controls whether the ITV in the same entry is outputted to a BSIFC counter 64. The emulation flag setting of 1 enables a gate 61 to pass a currently selected ITV to an adder 64 to add the ITV to the current content of BSIFC 64.

At the end of each dispatch in MINOR processor 18, a gate 66 outputs the accumulated emulation time content of BSIFC counter 64 to the BSIFA field in the associated task control block in main storage 14, wherein the emulation time is added to the current value in field 64 and the result becomes the new content of field 64.

In addition to the gating of counters 54 and 64 to the TCPUT and BSIFA fields (or instead of such gating if the average AV is not used), the outputs of gates 56 and 66 are connected to a microcode controlled divider 67 which divides the gated output of EMTC 54 by the gated output of BSIFC 64 to obtain the Last AV representing the affinity value computed only over the last dispatch of the task on the MINOR processor 18. The output of divider 67 is stored in the AV field of the associated task control block for use by the dispatcher program when it makes a future selection among tasks ready to execute as processor resources become available in the AMP.

While there has thus been described and illustrated plural embodiments of the invention, it will be clear that variations in the details of the embodiment specifically illustrated and described may be made therein without departing from the true spirit and scope of the invention as defined in the claims.

Having thus described my invention, what I claim as new and desire to secure by Letters Patent is:

1. A method for adjusting CPU usage time in an asymmetric multiprocessor system (AMP) having at least one major processor and at least one minor processor, the minor processor being designed to execute without emulation a subset of instructions executable also without emulation by the major processor, and other instructions being executable with emulation by the minor processor but being executable without emulation on the major processor, each processor executing dispatched program tasks, each task comprised of a plurality of the major processor's instructions, the processors being capable of interchanging the execution of any task in the AMP, the method comprising the steps of:

determining a real time measurement for each task that executes on the major processor and on the minor processor, generating an adjusted time value for each task that executes on the minor processor by modifying the real time measurement for the minor processor according to emulation characteristics of the minor processor for tasks executed on the minor processor, accumulating an adjusted total time value for the minor processor by summing the adjusted time values for all tasks executed on the minor processor over a given set of tasks or over a time period, and accumulating an actual total time value for the major processor by summing the real time measurements for all tasks executed on the major processor over a given set of tasks or over a time period, essentially the same amount of data processing being represented by a unit of the actual total time value for the major processor and by a unit of the adjusted total time value for the minor processor.

2. A method for determining CPU usage time, as recited in claim 1, the generating step comprising the steps of:

providing emulation code in a storage entity having emulation routines for system instructions not directly executable by a particular processor, counting the number of accesses for emulation code in the storage entity for system instructions being emulated by the minor processor in executing each task on the minor processor.

3. A method for determining an adjusted CPU usage time for each task in an AMP, as recited in claim 1, the generating step comprising the steps of:

generating an emulation value dependent on the time the minor processor spends emulating instructions during each dispatch of a task on the minor processor, adjusting each minor processor real time measurement for a task to obtain an adjusted time value representing an equivalent dispatch time on the major processor as if the major processor were instead to have executed the same instructions dispatched on the minor processor, applying conversion constants to each adjusted time value and to each emulation value for generating respective time components of an adjusted minor processor dispatch time for non-emulated and for emulated instructions executed during each task dispatch.

4. A method for determining adjusted CPU time for each task in an AMP, as recited in claim 3, the applying step comprising the steps of:

providing a non-emulation conversion constant for converting the adjusted time value of the minor processor into a non-emulation component of the minor processor dispatch time, also providing an emulation conversion constant for converting the emulation value into an emulation component of the adjusted minor processor dispatch time.

5. A method for determining an adjusted CPU usage time for each task in an AMP, as recited in claim 4, the providing step comprising the steps of:

generating the non-emulation conversion constant by selecting a instruction sequence having only instructions not requiring emulation on the minor processor, timing the execution of the instruction sequence on both the minor and major processors to respectively obtain first and second real time measurements, dividing the first by the second of the real time measurements to generate a non-emulation time ratio R as the non-emulation conversion constant, taking the product of each minor processor real time measurement and the ratio R and the product being the non-emulation component of the adjusted minor processor dispatch time.

6. A method for determining an adjusted CPU usage time for each task in an AMP, as recited in claim 4, the also providing step comprising the steps of:

generating the emulation conversion constant by selecting an instruction sequence having only instructions requiring emulation on the minor processor, timing the execution of the instructions on the major processor to respectively obtain a time measurement, counting the number of accesses for emulation code by the minor processor in executing the instruction sequence, dividing the time measurement by the number of accesses to obtain the emulation conversion constant F, obtaining a count of the number of accesses of emulation code in a separate storage entity during each task dispatch on the minor processor, taking the product of the emulation conversion constant F and the obtained count of the number of accesses by the minor processor to convert the obtained count into the emulation component of the adjusted minor processor dispatch time.

7. A method for determining an adjusted CPU usage time for each task in an AMP, as recited in claims 5 or 6, further comprising the steps of:

summing the non-emulation component and the emulation component at the end of each dispatch on the minor processor to generate the adjusted minor processor dispatch time for the last dispatch.

8. A method for determining CPU usage time in an AMP which is not varied by dispatching a task on any minor processor in the AMP, as recited in claim 1, the generating step further comprising the steps of:

operating an instruction unit in the minor processor to detect an operation code for each instruction being executed, forming an address from the operation code of a corresponding instruction being executed to select a time entry in an instruction time table, each time entry in the table containing an instruction time value (ITV) equal to the time that the corresponding instruction takes to execute on the major processor, outputting the ITV of each selected time entry to a dispatch controlled counter that accumulates the sum of the outputted ITVs over the time period of each dispatch of a program on the minor processor.

9. A method for determining adjusted CPU time on an asymmetric multiprocessing system (AMP), as recited in claim 8, further comprising the steps of:

utilizing the entries in the instruction time table only for instructions requiring emulation by the minor processor, gating out the content of the dispatch controlled counter at the end of each task dispatch on the minor processor, and then resetting to zero the content of the dispatch control counter, the gated out content indicating the time the task would have taken to execute the emulated instructions if the task had instead been dispatched on the major processor.

10. A method for determining adjusted CPU time on an asymmetric multiprocessing system (AMP) which does not vary as a function of task dispatches on a minor processor in the AMP as recited in claim 9, further comprising the steps of:

setting the ITV value in each entry of the instruction time table to represent the execution time on the major processor for the corresponding instruction.

11. A method for determining adjusted CPU time on an asymmetric multiprocessing system (AMP) which does not vary as a function of task dispatches on a minor processor in the AMP, as recited in claim 9, further comprising the steps of:

adding the adjusted minor processor dispatch time provided by the adjusting step to the gated out content of the dispatch controlled counter, storing the summed result of the adding step in a total CPU time field (TCPUT) in a control block for the task.

12. A method for determining adjusted CPU time on an asymmetric multiprocessing system (AMP), as recited in claim 8, further comprising the steps of:

utilizing the time entries in the instruction time table for all instructions whether or not any instruction requires emulation by the minor processor, gating out the content of the dispatch controlled counter at the end of each task dispatch on the minor processor, and then resetting to zero the content of the dispatch control counter, the gated out content indicating each dispatch time the task would have taken if the task had instead been dispatched on the major processor, the outputting step outputting the ITVs of all selected time entries to the dispatch controlled counter.

13. A method for determining adjusted CPU time on an asymmetric multiprocessing system (AMP) which does not vary as a function of task dispatches on a minor processor in the AMP as recited in claim 12, further comprising the steps of:

setting the ITV value in each entry of the instruction time table to represent the actual execution time on the major processor for the corresponding instruction, adding each gated out content of the dispatch controlled counter by the gating step to the content of the TCPUT field for the associated task, the TCPUT field containing the adjusted CPU time in the AMP for the task.

14. A method for determining an adjusted CPU time on an asymmetric multiprocessing system (AMP) which does not vary as a function of task dispatches on a minor processor in the AMP, as recited in claim 1, further comprising the steps of:

also accumulating an adjusted emulation time for each dispatch on the minor processor in an emulation accumulator field for the task,     dividing the content of the emulation accumulation field by the accumulated total time value during operation of a task to obtain an average affinity value (AV),     a dispatching control program using AV in determining the selection of a ready task to be next dispatched to an available processor in the AMP.

15. A method for determining an adjusted CPU time on an asymmetric multiprocessing system (AMP) which does not vary as a function of task dispatches on a minor processor in the AMP, as recited in claim 11, further comprising the steps of:

also accumulating the content of the dispatch controlled counter gated out by the gating step for each dispatch on the minor processor in an emulation accumulator field BSIFA associated with the task,     dividing the content of the emulation accumulator field BSIFA by the accumulated total CPU time in field TCPUT during operation of a task to obtain an average affinity value (AV),     a dispatching control program using the AV in determining the selection of a ready task to be next dispatched to an available processor in the AMP by dispatching a task on the minor processor by giving preference to a task having an AV with a low value relative to the AVs for other ready tasks.

16. A method for determining an adjusted CPU time on an asymmetric multiprocessing system (AMP) which does not vary as a function of task dispatches on a minor processor in the AMP, as recited in claim 13, further comprising the steps of:

providing a flag field with each time entry to indicate if the entry corresponds to an emulated or non-emulated instruction,     secondly accumulating only the ITVs from time entries having the flag field set to indicate emulation for the corresponding instruction during each dispatch on the minor processor in an emulation accumulator associated with the task,     dividing the result of the secondly accumulating step (providing an equivalent minor dispatch time) by the result of the adding step (providing the accumulated total CPU time) during operation of the task to obtain a last affinity value (AV) for the last dispatch by the task,     a dispatching control program using the last AV in determining the selection of a ready task to be next dispatched to an available processor in the AMP.

* * * * *